US009710485B2

(12) United States Patent
Xu et al.

(10) Patent No.: US 9,710,485 B2
(45) Date of Patent: Jul. 18, 2017

(54) DENSITY-BASED DYNAMIC GEOHASH

(71) Applicant: Twitter, Inc., San Francisco, CA (US)

(72) Inventors: Sen Xu, San Francisco, CA (US); Jonathan Simms, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 519 days.

(21) Appl. No.: 14/213,311

(22) Filed: Mar. 14, 2014

(65) Prior Publication Data
US 2015/0261786 A1 Sep. 17, 2015

(51) Int. Cl.
G06F 7/00 (2006.01)
G06F 17/30 (2006.01)

(52) U.S. Cl.
CPC .... *G06F 17/30241* (2013.01); *G06F 17/3087* (2013.01); *G06F 17/30327* (2013.01); *G06F 17/30961* (2013.01)

(58) Field of Classification Search
CPC ........ G06F 17/30241; G06F 17/30327; G06F 17/3087; G06F 17/30961
See application file for complete search history.

(56) References Cited

U.S. PATENT DOCUMENTS

| | | | |
|---|---|---|---|
| 6,240,418 B1 * | 5/2001 | Shadmon | G06F 17/30327 707/696 |
| 6,393,427 B1 * | 5/2002 | Vu | G06F 17/30873 707/797 |
| 8,478,289 B1 * | 7/2013 | Lookingbill | H04W 4/021 455/2.01 |
| 2006/0004715 A1 * | 1/2006 | Lock | G06F 17/30595 707/3 |
| 2010/0088342 A1 | 4/2010 | Ji et al. | |
| 2013/0097163 A1 | 4/2013 | Oikarinen et al. | |
| 2014/0274154 A1 * | 9/2014 | Rana | G06Q 30/0282 455/456.3 |

FOREIGN PATENT DOCUMENTS

WO 2008/005809 A2 1/2008

OTHER PUBLICATIONS

International Search Report and Written Opinon issued in corresponding International Application No. PCT/US2015/020230 dated Jun. 30, 2015 (10 pages).
International Preliminary Report on Patentability from International Application No. PCT/US2015/020230, mailed Sep. 22, 2016, 8 pp.

* cited by examiner

*Primary Examiner* — Marc Somers
(74) *Attorney, Agent, or Firm* — Shumaker & Sieffert, P.A.

(57) ABSTRACT

A method and system for maintaining a density-based geocode tree for a geographic area, including obtaining a geocode tree including multiple leaf nodes each having a geohash value corresponding to a subdivision of the geographic area, obtaining multiple positions within the geographic area, generating, using the multiple positions, multiple geohashes, mapping a first subset of the multiple geohashes to a first leaf node of the multiple leaf nodes based on the geohash value of the first leaf node, incrementing, by a cardinality of the first subset, a first counter value for the first leaf node, and grafting, in response to the first counter value exceeding a first density threshold, at least one child node onto the first leaf node.

17 Claims, 8 Drawing Sheets

DENSITY-BASED DYNAMIC GEOHASH

BACKGROUND

Location information is commonly used by vendors and service providers to reach consumers within a specified range of a target location.

SUMMARY

In general, in one aspect, embodiments of the invention provide a method for maintaining a density-based geocode tree for a geographic area, including obtaining a geocode tree including multiple leaf nodes each having a geohash value corresponding to a subdivision of the geographic area, obtaining multiple positions within the geographic area, generating, using the multiple positions, multiple geohashes, mapping a first subset of the multiple geohashes to a first leaf node of the multiple leaf nodes based on the geohash value of the first leaf node, incrementing, by a cardinality of the first subset, a first counter value for the first leaf node, and grafting, in response to the first counter value exceeding a first density threshold, at least one child node onto the first leaf node.

In general, in one aspect, embodiments of the invention provide a system for maintaining a density-based geocode tree, including memory and a computer processor for executing a tree maintenance application stored in memory and causing the computer processor to obtain a geocode tree including multiple leaf nodes each having a geohash value corresponding to a subdivision of the geographic area, obtain multiple positions within the geographic area, generate, using the multiple positions, multiple geohashes, map a first subset of the multiple geohashes to a first leaf node of the multiple leaf nodes based on the geohash value of the first leaf node, increment, by a cardinality of the first subset, a first counter value for the first leaf node, and graft, in response to the first counter value exceeding a first density threshold, at least one child node onto the first leaf node.

In general, in one aspect, embodiments of the invention provide a computer readable medium storing instructions for maintaining a density-based geocode tree, the instructions including functionality to obtain a geocode tree including multiple leaf nodes each having a geohash value corresponding to a subdivision of the geographic area, obtain multiple positions within the geographic area, generate, using the multiple positions, multiple geohashes, map a first subset of the multiple geohashes to a first leaf node of the multiple leaf nodes based on the geohash value of the first leaf node, increment, by a cardinality of the first subset, a first counter value for the first leaf node, and graft, in response to the first counter value exceeding a first density threshold, at least one child node onto the first leaf node.

Other aspects of the invention will be apparent from the following description and the appended claims.

DETAILED DESCRIPTION

Figure 1:
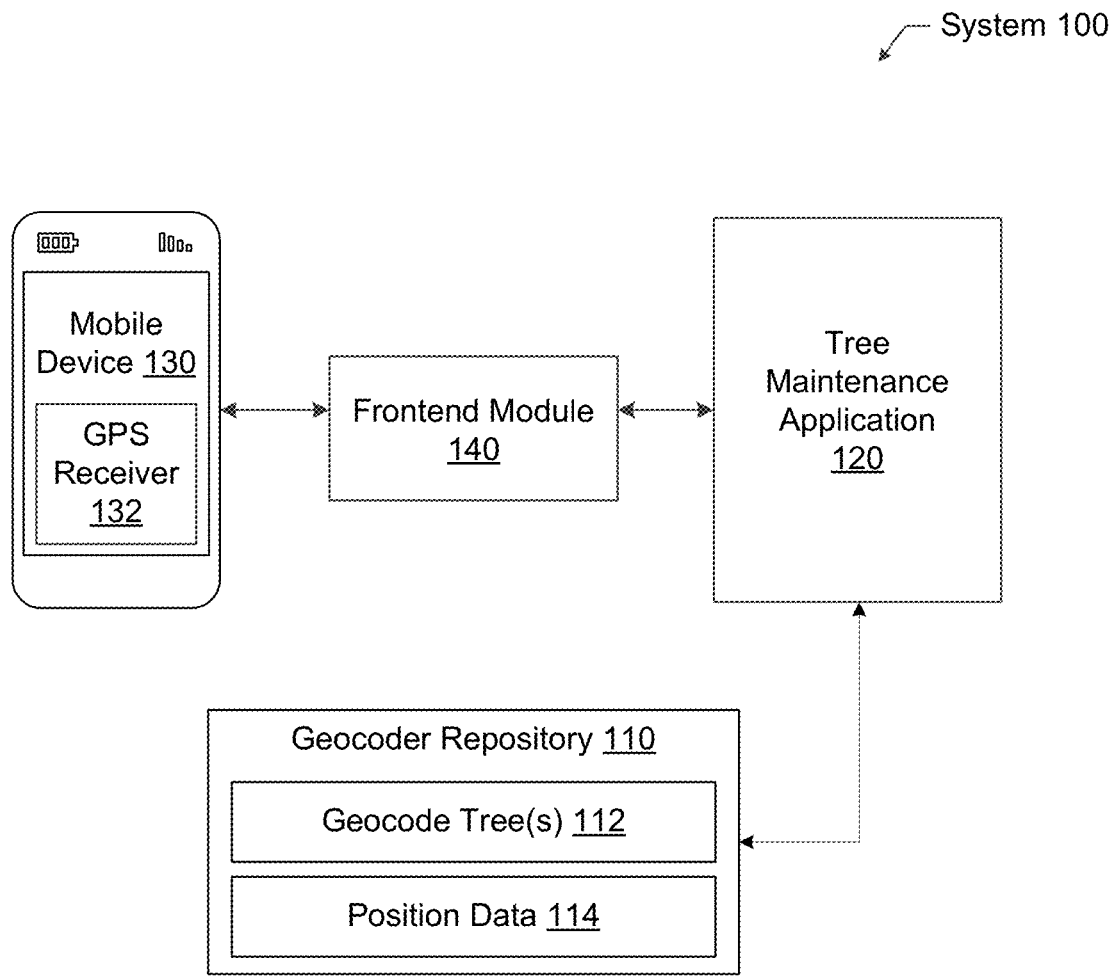
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention are directed to a method and system for processing a reverse geocode request (including a global position within a geographic area) and returning an identifier of a subdivision of the geographic area that encompasses the position. One or more embodiments of the invention generate geohash values from global positions using varying levels of precision based on a population density map, such that a more precise geohash may be generated from a global position in a higher-density region of the geographic area. Conversely, a less precise geohash may be generated from a global position in a lower-density region, requiring fewer computational resources. One or more embodiments of the invention may process reverse geocode requests using a hierarchical data structure based on geohashes of varying precision, thus allowing for faster processing times and lower memory requirements for less populated areas, where greater precision may be unnecessary.

FIG. 1 shows a system in accordance with one embodiment of the invention. As shown in FIG. 1, the system has multiple components including a geocoder repository (110), a tree maintenance application (120), a mobile device (130), and a frontend module (140). Each of these components is described in more detail below.

In one or more embodiments of the invention, the geocoder repository (110) is any type of storage unit and/or device (e.g., a file system, database, collection of tables, or any other storage mechanism) for storing data. Further, the geocoder repository (110) may include multiple different storage units and/or devices. The multiple different storage units and/or devices may or may not be of the same type or located at the same physical site.

In one or more embodiments of the invention, the geocoder repository (110) is configured to store one or more geocode tree(s) (112), position data (114), and/or any other data relevant to geocode-related functionality. In one or more embodiments of the invention, geocoding refers to the process of obtaining a global position (e.g. a set of latitude and longitude coordinates) from associated geographic data (e.g. street addresses or postal codes). Conversely, reverse geocoding refers to the opposite process of obtaining associated geographic data from a global position. One or more embodiments of a geocode tree (112) are discussed in further detail below. Position data (114) may include any information identifying one or more global positions, for example, GPS coordinates, postal addresses, geohashes, other geographic identifiers, or any combination thereof.

The tree maintenance application (120) may be any combination of hardware, software, and/or firmware. In one or more embodiments of the invention, the tree maintenance application (120) may include functionality to identify a geographic area that includes one or more subdivisions (i.e. cells in a grid). The geographic area may be, for example, the planet Earth, the United States of America, or the city of Chicago. The geographic area may be obtained from the geocoder repository (110), an external source, or may be predetermined by a user. The geographic area may be divided into subdivisions of identical size and/or subdivisons of differing sizes. The subdivisions may be non-overlapping, or, in the case of overlapping subdivisions, one subdivision may encompass one or more additional subdivisions.

The tree maintenance application (120) includes functionality to obtain and/or generate a geocode tree of a desired depth. In one or more embodiments of the invention, a geocode tree is a tree data structure having a plurality of nodes including a root node, intermediate nodes, and leaf nodes. In one or more embodiments of the invention, with the exception of the root node, a node in the geocode tree is defined by a unique geohash value that corresponds to a unique subdivision of the geographic area. In one or more embodiments of the invention, geohash or geohashing refers to a latitude/longitude geocode system that defines subdivisions of a geographic area by alphanumeric text strings called geohashes. Each character position of a geohash corresponds to a further subdivision of the cell defined by the character(s) preceding it. Geohashes offer arbitrary precision in that a longer geohash string refers to a smaller subdivision of the geographic area. Conversely, a longer geohash can be truncated to reduce its size at the cost of losing precision. One or embodiments of the invention may be implemented using geocode trees obtained and/or generated using other geocode systems than geohash; for example, GOOGLE's S2.

In one or more embodiments of the invention, the root node of a geocode tree corresponds to the entire identified geographic area and populates the zeroth level of the tree. A depth value of the geocode tree refers to a level of the tree beginning with a zero value at the root node and incrementing downward at each subsequent level. The root node has a depth of zero and is not defined by a geohash value. The root node has a plurality of child nodes at the first level of the tree (i.e. having a depth of one), each child node representing a first-order subdivision of the geographic area. In one or more embodiments of the invention, each first-level node may be defined by a one-character geohash value. In other embodiments of the invention, each first-level node may be defined by an n-character geohash value of equal length.

A first level node may have its own plurality of child nodes at the second level of the tree (i.e. depth=2), each child node corresponding to a second-order subdivision of the geographic area. In other words, each second-level node corresponds to a further subdivision of the geographic subdivision represented by the second-level node's parent (first-level) node. Conversely, the geographic subdivision corresponding to a first-level node includes all of the smaller subdivisions represented by the first-level node's child (second-level) nodes, if any. In a similar fashion, a given node at any level of the tree includes all of the smaller subdivisions corresponding to that node's child nodes, if any.

Each second-level node may be defined by a two-character geohash. The first character of a second-level node's geohash value is equal to the geohash value defining the second-level node's parent (first-level) node. Similarly, the geohash defining a given node at any level of the tree is equal to the geohash value of that node's parent node concatenated with one additional character.

Figure 2A:
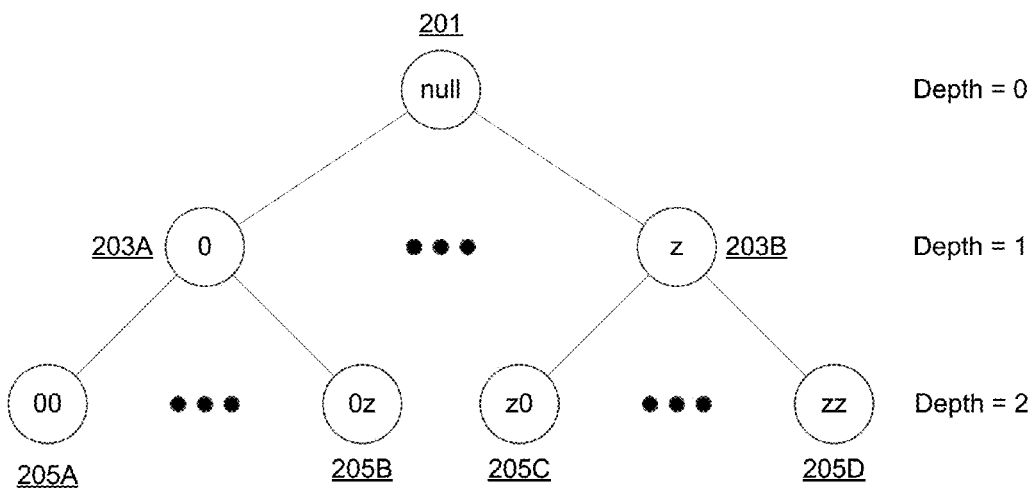
FIGS. 2A-2C show an example in accordance with one or more embodiments of the invention.

As an example, FIG. 2A shows a geocode tree having three levels of nodes, in accordance with one or more embodiments of the invention. In FIG. 2A and succeeding figures, the use of collinear dots indicates that additional nodes of similar type to the preceding and succeeding nodes (with respect to the dots) may optionally exist. The root node (201) has no geohash value and a depth of zero. The two depicted intermediate nodes (203A, 203B) are defined by geohash values of "0" and "z" and each intermediate node has a depth of one. The four depicted leaf nodes (205A, 205B, 205C, 205D) are defined by geohash values of "00", "0z", "z0", and "zz", respectively, and each leaf node has a depth of two.

Figure 2B:
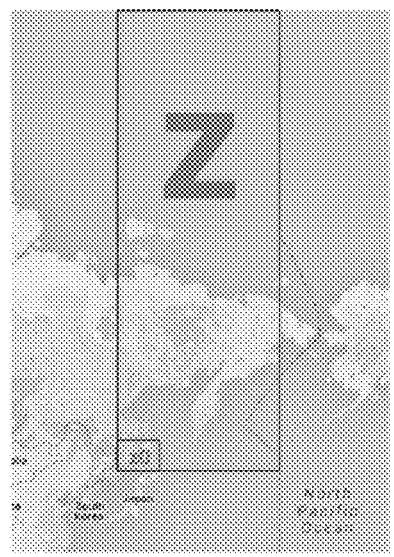
Figure 2C:

FIG. 2B depicts a bounding box on a geographical map corresponding to the geohash "z" (a value that defines one of the intermediate nodes (203B) in the geocode tree of FIG. 2A). The bounding box is a subdivision of the planet Earth encompassing parts of Russia, North Korea, Japan, and surrounding ocean. FIG. 2C depicts a further subdivision of the bounding box shown in FIG. 2B, corresponding to a geohash value of "z0" (a value that defines one of the leaf nodes (205C) in the geocode tree of FIG. 2A) and encompassing only parts of North Korea and the northern tip of Japan.

Returning to the discussion of FIG. 1, in one or more embodiments of the invention, the tree maintenance application (120) includes functionality to obtain multiple positions within a geographic area. Each position may be in one of a number of formats including, for example, a GPS coordinate set, postal address, zip code, and/or geohash.

In one or more embodiments of the invention, the tree maintenance application (120) includes functionality to receive and process a reverse geocode lookup request including a position. For example, the reverse geocode lookup request may include a position expressed as a geohash value. Alternatively, the position may be a GPS coordinate set originating from a GPS receiver (132) resident on a mobile device (130).

The tree maintenance application (120) may include functionality to generate a geohash using a position. In one or more embodiments of the invention, a geohash may be generated from a position using one of a number of algorithms. A geohash may be generated, for example, by interleaving the bits of the latitude and longitude of a position expressed in coordinates and encoding the result in base 32 to create a convenient string representation (i.e. the geohash). In other embodiments, a geohash may be generated by encoding the interleaved bits of the position into another format, for example, base 36. The generated geohash may then be used in a reverse geocode lookup request to obtain a geographic identifier (e.g. map) of the cell defined by the geohash, for example, by traversing a hierarchical data structure of references to geographic identifiers.

The tree maintenance application (120) may include functionality to map one or more geohashes to a leaf node in the geocode tree based on the geohash value of the leaf node. In one or more embodiments of the invention, mapping a geohash to a leaf node in the geocode tree may include traversing the geocode tree to identify the leaf node defined by a geohash value matching the geohash. Identifying the leaf node can involve an approximate match (reaching a leaf node of the geocode tree using the first n characters of the geohash) or an exact match (all characters of the geohash match the geohash value of the leaf node).

In one or more embodiments of the invention, the tree maintenance application (120) includes functionality to return an identifier of the subdivision of the geographic area corresponding to the geohash value of the mapped leaf node (i.e. the subdivision containing the position used to generate the geohash). The geohash value defining the identified node may be used as input to a hash table to obtain an identifier of the aforementioned subdivision. Alternatively, the leaf node may itself include a reference to an identifier of the subdivision. The tree maintenance application (120) may provide an identifier of the subdivision and/or additional information associated with the subdivision (e.g. a business or neighborhood name, a position coordinate or postal address, etc.) in response to a reverse geocode lookup request.

In one or more embodiments of the invention, the tree maintenance application (120) includes functionality to increment a counter value for the mapped leaf node. The counter value may be incremented by the number of geohashes matching the geohash value of the leaf node. The tree maintenance application (120) may include functionality to compare the counter value for a leaf node to a density threshold. The density threshold may be any predetermined value, or it may be entered by a user or administrator at the time of the comparison.

In one or more embodiments of the invention, the tree maintenance application (120) includes functionality to graft nodes onto the geocode tree and to prune nodes from the geocode tree. Grafting and/or pruning nodes may be performed in response to the counter value for a leaf node of the geocode tree exceeding or failing to exceed a density threshold.

The mobile device (130) is a hardware device capable of executing software (e.g., a mobile application). In one or more embodiments of the invention, the mobile device (130) may be any device including capability to obtain one or more positions and communicate the position(s) to the system 100. Examples of a mobile device (130) may include, but are not limited to, a smartphone, a laptop computer, a tablet computer, a PDA, a navigation device, and a netbook computer.

In one or more embodiments of the invention, the mobile device (130) includes a global positioning system ("GPS") receiver (132). The GPS receiver (132) is any combination of software, firmware, and/or hardware that executes on the mobile device (130) to track the global position of the mobile device (130). The GPS receiver (132) may be resident on the mobile device (130), or via a wireless connection with another source of GPS information, for example, a mobile access point. In one or more embodiments of the invention, the GPS receiver (132) includes functionality to provide to the mobile device (130) positions having GPS coordinate or any other format detailing the global position of the mobile device (130). The mobile device (130) may be implemented using other positioning technologies or mechanisms without departing from the invention.

In one or more embodiments of the invention, the frontend module (140) may include functionality to communicate with external entities (e.g. a mobile device (130)). The frontend module (140) may include the application programming interface ("API") and/or any number of other components used for communicating with entities outside of the system (100). The API can include any number of specifications for making requests from and/or providing data to the system (100). For example, a function of the API can provide reverse geocode lookups to a requesting mobile device (130).

While FIG. 1 shows a configuration of components, other configurations may be used without departing from the scope of the invention. For example, various components may be combined to create a single component. As another example, the functionality performed by a single component may be performed by two or more components.

Figure 3:
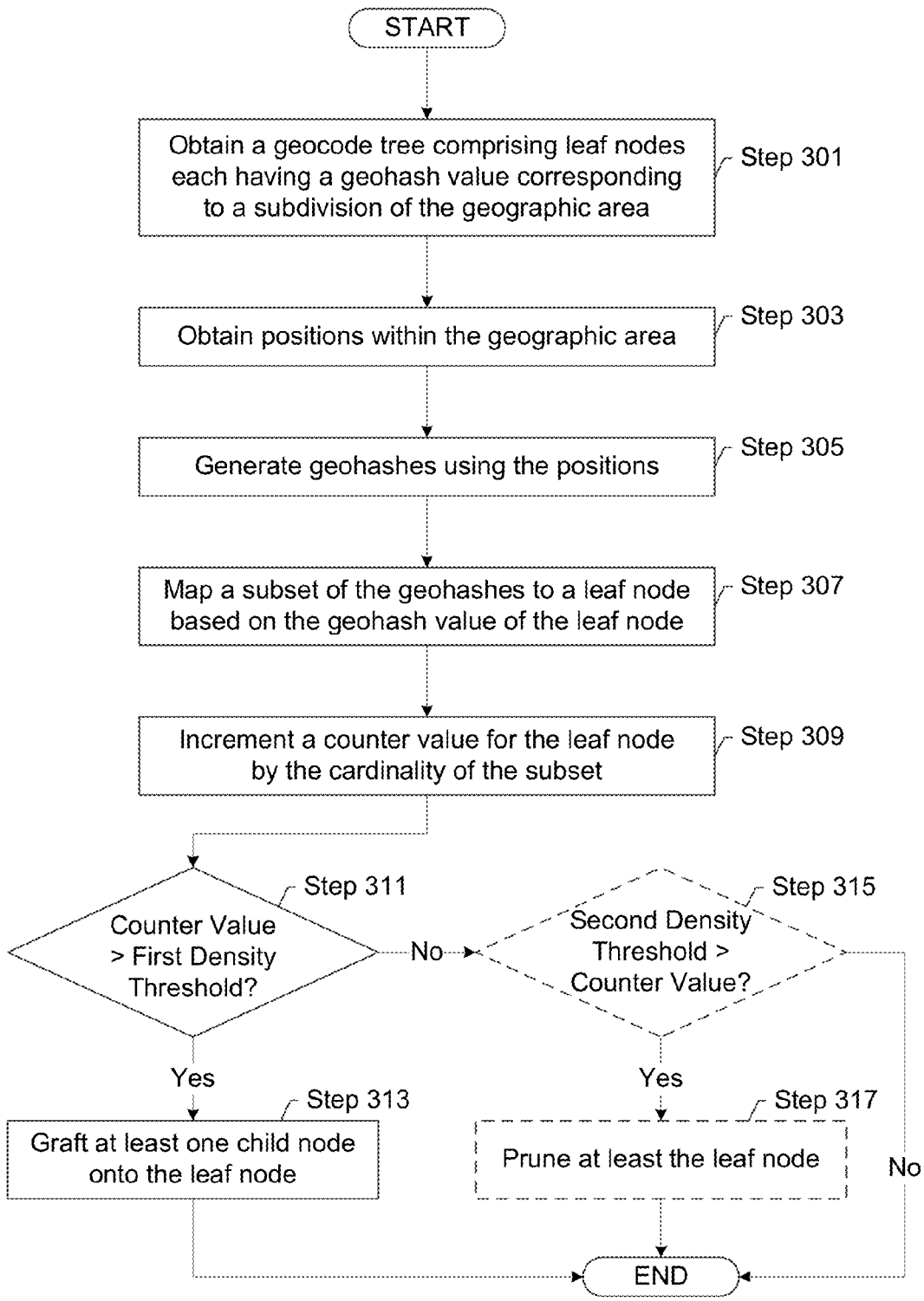
FIG. 3 shows a flowchart in accordance with one or more embodiments of the invention.

FIG. 3 shows a flowchart for maintaining a density-based geocode tree in accordance with one or more embodiments of the invention. The process shown in FIG. 3 may be used, for example, with the system of FIG. 1 to maintain the density-based geocode tree. While the various steps in this flowchart are presented and described sequentially, one of ordinary skill will appreciate that some or all of the steps may be executed in different orders, may be combined or omitted, and some or all of the steps may be executed in parallel.

In Step 301, a geocode tree is obtained. The geocode tree may be obtained from a geocode repository. Alternatively, the geocode tree may be newly generated by the tree maintenance application. The geocode tree includes a plurality of nodes including leaf nodes, each node having a geohash value corresponding to a subdivision of the geographic area. In one embodiment of the invention, each non-leaf node in the geocode tree has a maximum of 32 child nodes, corresponding to the 32 alphanumeric values of a single character in a standard geohash format.

In one or more embodiment of the invention, the obtained or generated geocode tree is a perfect tree, meaning that each non-leaf node has the maximum number of child nodes, and that each leaf node has the same depth (i.e., level) in the geocode tree. In other words, a perfect tree resembles a triangle in appearance. In alternative embodiments, the geocode tree is a complete tree. In still alternative embodiments, the geocode tree is a balanced tree. Other types of tree data structures may be obtained or generated without departing from embodiments of the invention.

In Step 303, positions within the geographic area are obtained. For example, in one or more embodiments of the invention, the tree maintenance application may obtain a position of a mobile device from a GPS receiver resident on the mobile device. Multiple positions may be obtained at once or over a predetermined time interval and from one or more devices. As an example, the global positions of multiple mobile devices in a specific time zone may be obtained from those devices once an hour between the hours of 8 a.m. and 8 p.m. In one or more embodiments of the invention, the positions may be scraped from Internet messaging services. For example, all user posts on a particular social media platform posted at 12:18 p.m. may be scraped to provide the embedded positions of those users at that specific time. In other embodiments, the positions may be obtained from a data source storing, for example, population density data.

In Step 305, geohashes are generated using the positions obtained in Step 303. The geohashes may be generated by applying the above-mentioned algorithm to the position to obtain an alphanumeric string (i.e. interleaving the longitude and latitude bits of the position and converting to the desired base). For example, the alphanumeric string may be a base 32 string. If the position obtained is in a format other than a set of coordinates, for example, a street address or a zip code, the position may be converted to a coordinate format before a geohash is generated. The length of the generated geohash may depend on the precision of the position obtained. For example, converting a coordinate having 20 decimal places will generate a longer geohash than converting a coordinate having 10 decimal places. Additionally, the generated geohash may be truncated to a predetermined length.

In Step 307, at least a subset of the geohashes generated in the previous step are mapped to a leaf node in the geocode tree based on the geohash value of the leaf node. As stated above, in one or more embodiments of the invention, this is accomplished by traversing the geocode tree using the geocode to identify the leaf node matching n characters in the geohash. Because the geohash value of a leaf node corresponds to a subdivision of the geographic area, a plurality of geohashes generated from the obtained positions may map to a single leaf node (indicating that the plurality of positions fall within the subdivision corresponding to that leaf node). Alternatively, none of the geohashes generated from the obtained positions may map to any leaf node (indicating that none of the positions fall within the subdivision corresponding to that leaf node).

In Step 309, a counter value for the leaf node is incremented by the number of geohashes in the subset that map to the leaf node. This number may be zero, one, or any ordinal number. In Step 311, the counter value is compared to a first density threshold. The first density threshold may be predetermined by an administrator or a user, or may be determined automatically based on, for example, the number of total positions obtained in Step 303.

In Step 313, at least one child node is grafted onto the leaf node in response to the counter value exceeding the first density threshold. In one or more embodiments of the invention, a full set of child nodes (32 nodes, for example) are grafted onto the leaf node, so that future positions obtained by the system may be mapped to more precise geographic subdivisions.

In optional Step 315, it has been determined that the counter value does not exceed the first density threshold. The counter value is then compared to a second density threshold. The second density threshold may be predetermined by an administrator or a user, or may be determined automatically based on, for example, the number of total positions obtained in Step 303.

In optional Step 317, at least the leaf node is pruned from the geocode tree in response to the second density threshold exceeding the counter value. In one or more embodiments of the invention, the leaf node and all its siblings are pruned from the geocode tree, in response to the second density threshold exceeding the counter values for the leaf node and its siblings (indicating that less precision is necessary than that currently provided by the geocode tree).

While the various steps in this flowchart are presented and described sequentially, one of ordinary skill will appreciate that some or all of the steps may be executed in different orders, may be combined or omitted, and some or all of the steps may be executed in parallel.

Figure 4A:
FIGS. 4A-4B show an example in accordance with one or more embodiments of the invention.

FIG. 4A shows an exemplary geographic area delimiting multiple subdivisions, in accordance with one or more embodiments of the invention. The geographic area is roughly centered on New York City. The bounded boxes represent subdivisions of the geographic area corresponding to nodes at the same level in a geocode tree, each node having the geohash value indicated inside the box. The color of the boxes indicate relative population density, with light grey indicating a lowest-density subdivision as compared to other bounded subdivisions in FIG. 4A. A dark grey box indicates a highest-density subdivision as compared to the other bounded subdivisions.

Figure 4B:
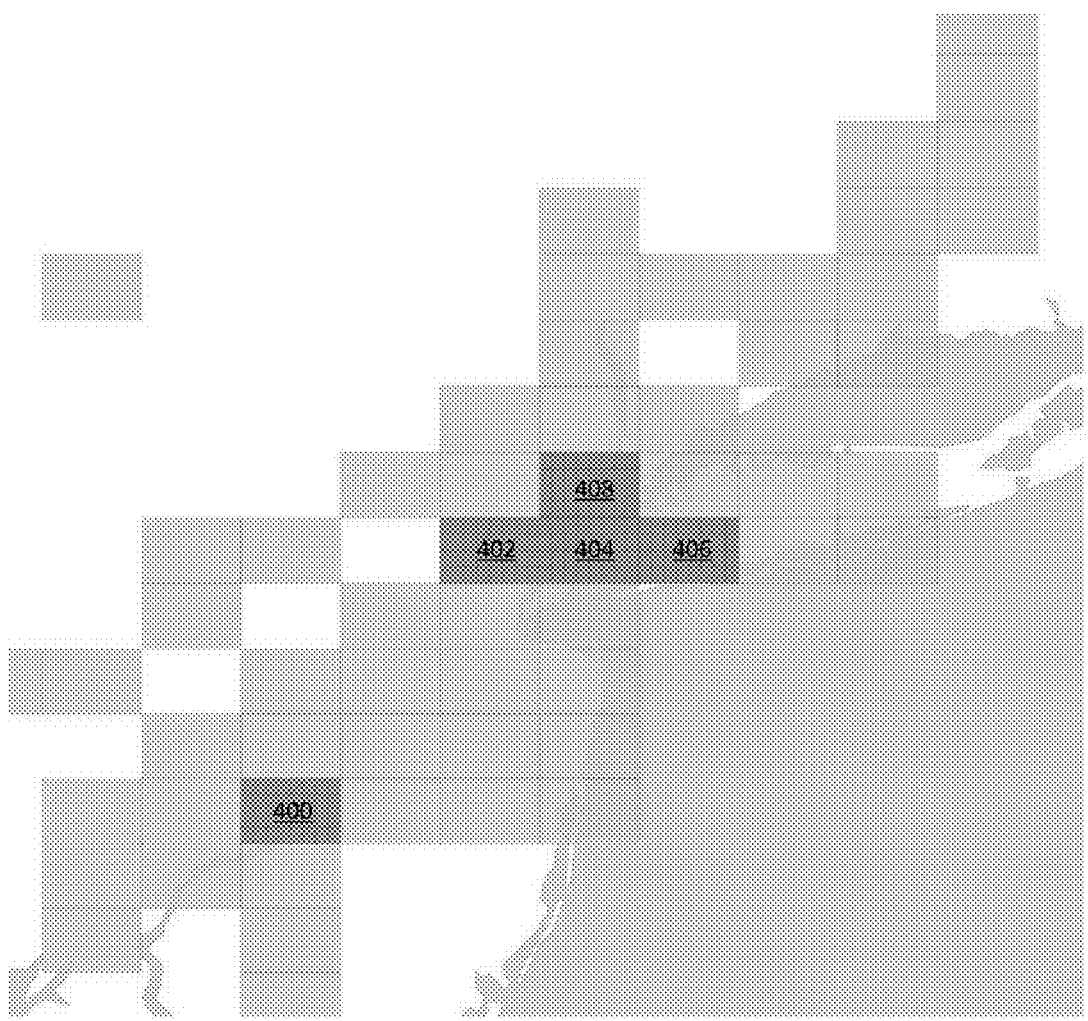

FIG. 4B shows the same exemplary geographic area depicted in FIG. 4A again delimiting multiple subdivisions, in accordance with one or more embodiments of the invention. As in FIG. 4A, the bounded boxes represent subdivisions of the geographic area corresponding to nodes in a geocode tree; however, FIG. 4B includes further subdivisions of the highest-density boxes depicted in FIG. 4A (400, 402, 404, 406, 408). In other words, the nodes in the geocode tree corresponding to FIG. 4B are not all at the same level. Accordingly, FIG. 4B corresponds to a geocode tree resulting from grafting child nodes onto the geocode tree corresponding to FIG. 4A, where the child nodes are grafted based on their parent nodes' population densities exceeding a threshold, as described in the steps of FIG. 3.

Figure 5:
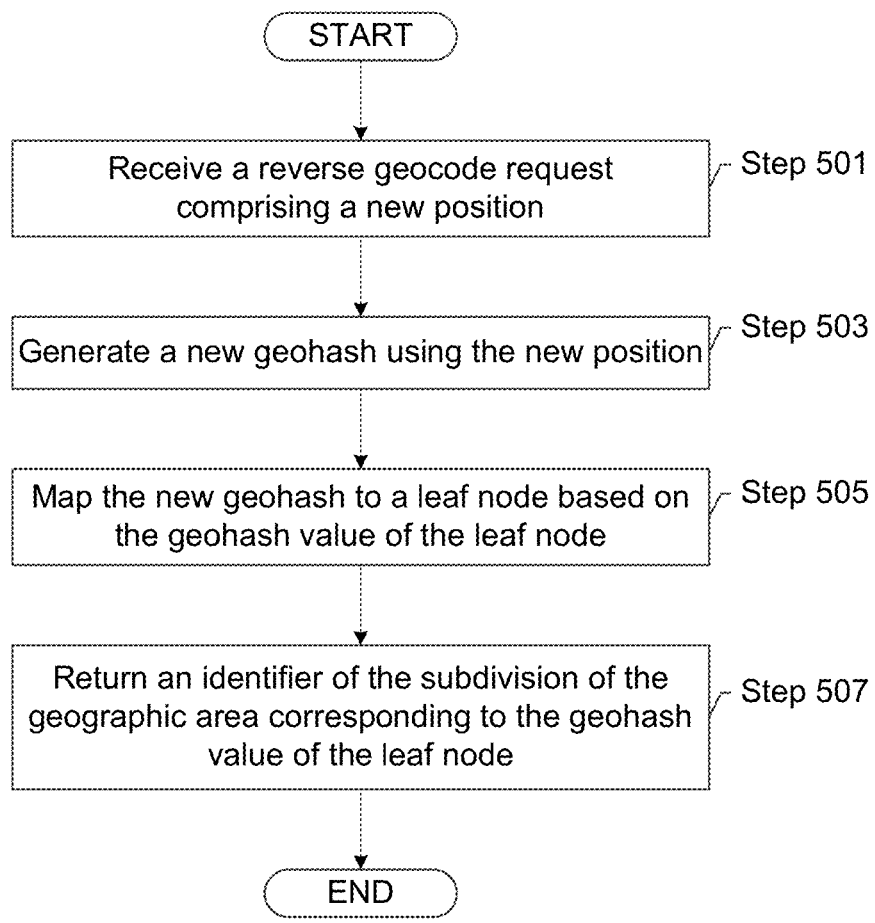
FIG. 5 shows a flowchart in accordance with one or more embodiments of the invention.

FIG. 5 shows a flowchart for performing a reverse geocode lookup in accordance with one or more embodiments of the invention. The process shown in FIG. 5 may be used, for example, with the system of FIG. 1 to perform the reverse geocode lookup. While the various steps in this flowchart are presented and described sequentially, one of ordinary skill will appreciate that some or all of the steps may be executed in different orders, may be combined or omitted, and some or all of the steps may be executed in parallel.

In Step 501, a reverse geocode lookup request including a new position is received by the system. The new position may be in one of a number of formats including, for example, a GPS coordinate set, postal address, zip code, and/or geohash. The reverse geocode lookup request may be received, for example, from a mobile device.

In Step 503, a new geohash is generated using the position. The new geohash is generated in substantially the same manner as geohashes are generated using obtained positions in Step 305.

In Step 505, the new geohash is mapped to a leaf node of the geocode tree based on the geohash value of the leaf node. The new geohash is mapped to a leaf node in substantially the same manner as the subset of geohashes are mapped to a leaf node in Step 307.

In Step 507, an identifier of the subdivision of the geographic area corresponding to the geohash value of the leaf node is returned. In one or more embodiments of the invention, the identifier is a map tile depicting the subdivision within which the obtained position exists. In other embodiments, the identifier may have another format properly identifying the subdivision. The identifier may be returned to the entity that provided the reverse geocode lookup request, for example, the mobile device specified in Step 401.

Figure 6A:
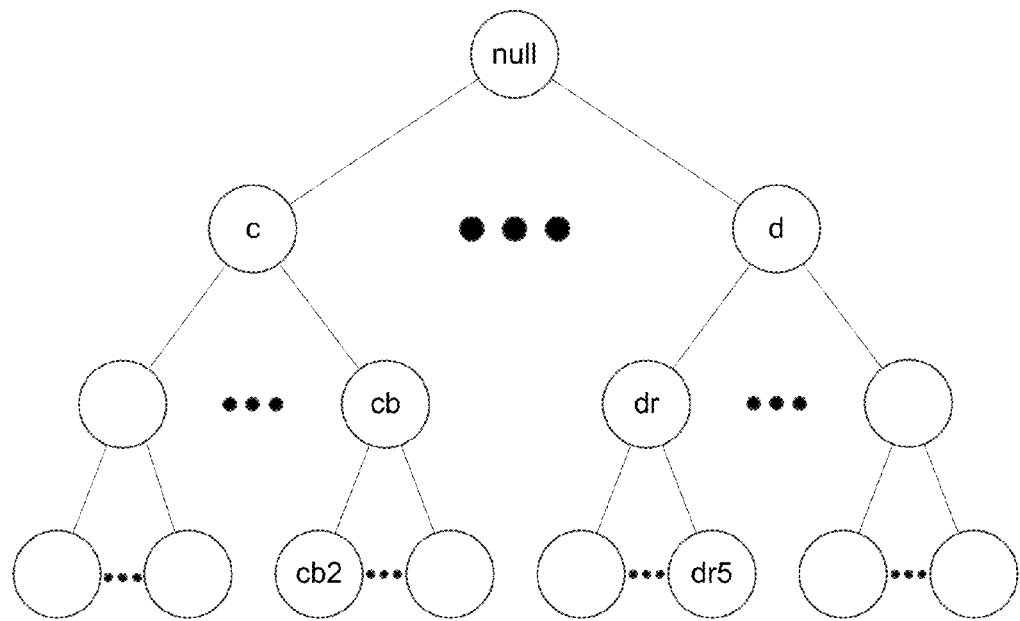
FIGS. 6A and 6B show an example in accordance with one or more embodiments of the invention.
Figure 6B:
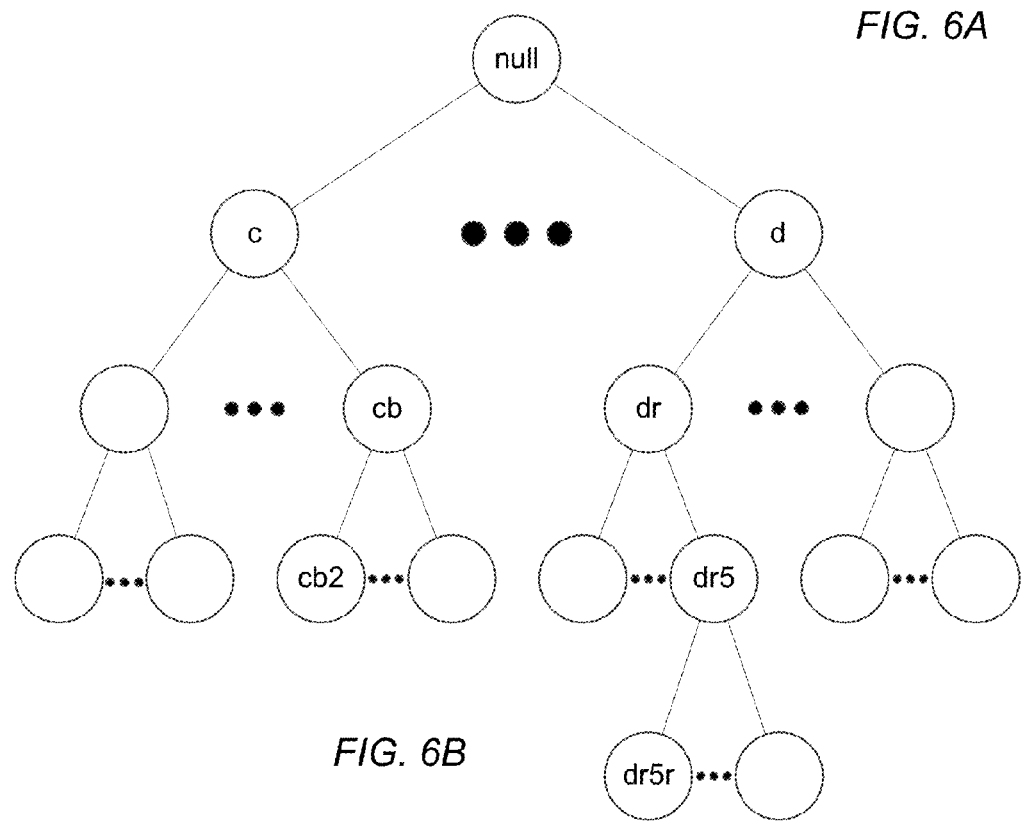

The following example, shown in FIGS. 6A and 6B, is for explanatory purposes only and not intended to limit the scope of the invention. In other words, the following example is an example of one embodiment of the invention. Other embodiments may exist without departing from the scope of the invention.

A geocode tree is obtained having four levels of nodes and corresponding to a geographic area encompassing the planet Earth. The zeroth level of the tree includes only the root node, which has no geohash value. The first level of the tree includes 32 child nodes of the root node, each defined by a one-character geohash. Each node at the first level of the tree has a geohash value corresponding to an equally-sized $1/32^{nd}$ subdivision of the Earth. The leftmost node has a geohash value of "0", and the rightmost node has a geohash value of "z". Using a traditional geohash system, the node having a geohash value of "d" corresponds to a subdivision of the Earth roughly encompassing the eastern seaboard of the United States, the Caribbean, and South America above the equator.

The second level of the tree includes 1,024 (32×32) nodes. Each set of 32 nodes are siblings of each other, or in other words, child nodes of the same first level parent node. Each node at the second level of the tree has a geohash value corresponding to an equally-sized $1/1024^{th}$ subdivision of the Earth. The leftmost node has a geohash value of "00", and the rightmost node has a geohash value of "zz". Using a traditional geohash system, the node having a geohash value of "dr" corresponds to a subdivision of the Earth roughly encompassing New England.

The third and final level of the tree includes 32,768 (32×32×32) leaf nodes. Each set of 32 leaf nodes are siblings of each other, or in other words, child nodes of the same second level parent node. Each node at the third level of the tree has a geohash value corresponding to an equally-sized $1/32,768^{th}$ subdivision of the Earth. The leftmost node has a geohash value of "000", and the rightmost node has a geohash value of "zzz". Using an exemplary geohash system, the node having a geohash value of "dr5" corresponds to a subdivision of the Earth roughly encompassing greater New York City. Additionally, the node having a geohash value of "cb2" corresponds to a subdivision roughly encompassing Bismarck, N. Dak. and the surrounding region.

In its present condition, the four level geocode tree offers the same level of precision for a reverse geocode lookup request including a position in New York City and a reverse geocode lookup request including a position in Bismarck, N. Dak.

Over the course of a given day, individual users collectively post one thousand messages to a popular social media platform, each message embedded with a coordinate position of the messaging user's mobile phone at the time the message is posted. The users and their mobile phones are distributed across the continental United States.

The system obtains the plurality of positions embedded in the messages just described. Each position is converted to a geohash. Of the plurality of positions obtained, one position in the vicinity of Bismarck, N. Dak. has the coordinate set 47.5° N and 100.5° W. Using an exemplary geohash algorithm, the geohash "cb2w1" is generated from this coordinate set.

The system maps this geohash to the leaf node of the geocode tree defined by the geohash value "cb2." This mapping is performed by traversing the geocode tree using the geohash. Specifically, starting at the root node, the tree is traversed by determining whether the root node has a child node defined by the value "c". Node "c" exists, so the system follows the transition to node "c" and then determines whether node "c" has a child node defined by the value "cb". This process is repeated until there are no more valid transitions, or in other words, the process has reached a leaf node (in this case, the leaf node "cb2"). At this point, the geohash "cb2w1" has been mapped to the leaf node defined by the geohash value "cb2".

A counter value for this node is incremented by the number of positions (of the multiple positions obtained) that map to the node. Of this set of positions, only one position is obtained near Bismarck, N. Dak. A counter value for the node "cb2" is incremented by one. However, twenty positions (of the multiple positions obtained) are in the vicinity of New York City. Accordingly, a counter value for the node "dr5" is incremented by twenty.

The counter value for "dr5" is compared to a density threshold. In this case, the density threshold has a predefined value of ten. Because the system has obtained more than ten positions in the New York City area (and consequently the counter value for dr5 is greater than the density threshold), thirty-two child nodes are grafted onto the "dr5" node at a new fourth level of the geocode tree. Each one of these new child nodes is similarly defined by a more precise geohash value equal to the string "dr5" concatenated with an additional character.

At some time thereafter, a user desires to run two reverse geocode lookup requests; the first using a position near Bismarck, N. Dak., and the second using a position in New York City. The system once again obtains each position, generates a geocode from the position, and maps the generated geocode to a leaf node in the geocode tree. Using the geocode tree manipulated in previous steps, the system maps the Bismarck position to the "cb2" node, but the New York City position is now mapped to a new "dr5r" node. The system then returns a map tile identifier representing the subdivision of North Dakota corresponding to the "cb2" node. The system also returns a smaller map tile identifier representing the subdivision of New York City corresponding to the "dr5r" node. Consequently, reverse geocode lookups may now return more precise information using positions in densely populated New York City than using positions in sparsely populated Bismarck, N. Dak. Additionally, memory may be saved by using a geocode tree having varying levels of precision according to the demands of differing geographic regions.

Without limitation, one or more embodiments of the invention may include reverse-geocoding functionality for use in the following exemplary cases: (i) a cellular carrier determining whether a mobile device falls within the carrier's coverage areas; (ii) quickly determining the country, province, state, metropolitan area, city, zipcode, and/or other toponym that a mobile device's position is within; (iii) efficient lookup of a quantitative attribute associated with a geographic subdivision, for example, population, per capita income, racial composition, pollution level, traffic flow, etc.; and (iv) address reverse geocoding (i.e. providing a postal address from a given set of GPS coordinates, accordingly requiring a finely-grained geocode tree). One or more embodiments of the invention may enable maintaining geocode and reverse-geocode lookup performance while substantially reducing the size of the required geocode tree (e.g., 10× reduction versus balanced geocode trees), and providing faster performance in cases where unnecessarily fine-grained branches can be pruned from a given geocode tree.

Figure 7:
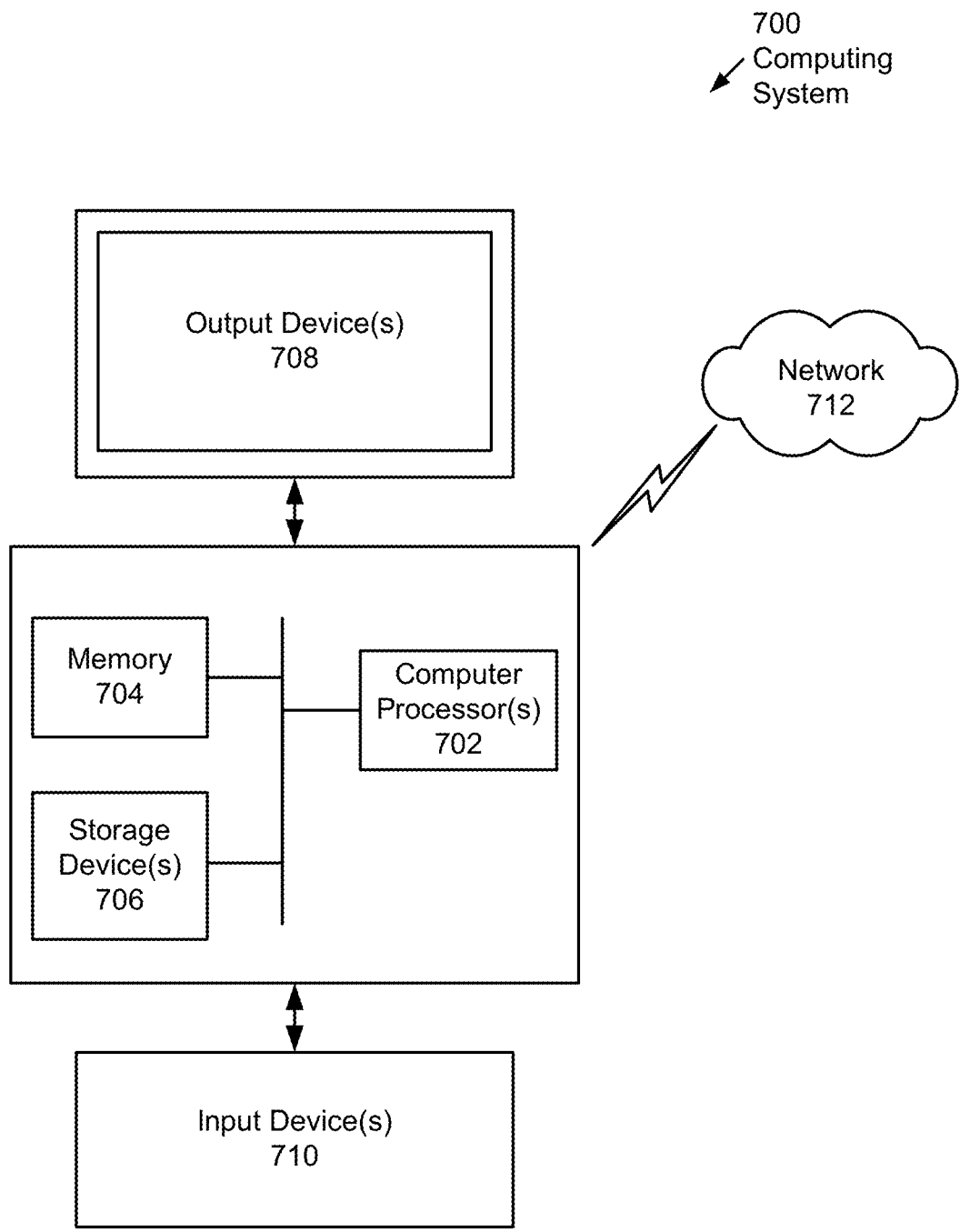
FIG. 7 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (714) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (714). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for maintaining a density-based geocode tree for a geographic area, comprising:
    obtaining a geocode tree comprising a plurality of leaf nodes each having a geohash value corresponding to a subdivision of the geographic area;
    obtaining a plurality of positions within the geographic area;
    generating, using the plurality of positions, a plurality of geohashes;
    mapping a first subset of the plurality of geohashes to a first leaf node of the plurality of leaf nodes based on the respective geohash value of the first leaf node;
    incrementing, by a cardinality of the first subset, a first counter value for the first leaf node;
    grafting, in response to the first counter value exceeding a first density threshold, at least one child node onto the first leaf node;
    mapping a second subset of the plurality of geohashes to a second leaf node of the plurality of leaf nodes based on the respective geohash value of the second leaf node;
    incrementing, by a cardinality of the second subset, a second counter value for the second leaf node; and
    pruning, in response to a second density threshold exceeding the second counter value for the second leaf node, the second leaf node and every sibling of the second leaf node from the geocode tree.

2. The method of claim 1, wherein the geocode tree is of a type selected from the group consisting of a perfect tree, a complete tree, and a balanced tree.

3. The method of claim 1, wherein the plurality of positions are obtained from a data source comprising population density data.

4. The method of claim 1, wherein the plurality of positions comprise global positions of mobile devices.

5. The method of claim 1, further comprising:
    receiving a reverse geocode lookup request comprising a new position;
    generating a new geohash using the new position;
    mapping the new geohash to a leaf node of the plurality of leaf nodes based on the geohash value of the leaf node; and
    returning an identifier of the subdivision of the geographic area corresponding to the geohash value of the leaf node.

6. The method of claim 5, wherein the identifier is of a type selected from the group consisting of a map tile, an address range, a zip code, and a place name.

7. A system for maintaining a density-based geocode tree, comprising:
    a computer processor; and
    a memory configured to store instructions that are executable by the computer processor to:
        obtain a geocode tree comprising a plurality of leaf nodes each having a geohash value corresponding to a subdivision of the geographic area;
        obtain a plurality of positions within the geographic area;
        generate, using the plurality of positions, a plurality of geohashes;
        map a first subset of the plurality of geohashes to a first leaf node of the plurality of leaf nodes based on the respective geohash value of the first leaf node;
        increment, by a cardinality of the first subset, a first counter value for the first leaf node;
        graft, in response to the first counter value exceeding a first density threshold, at least one child node onto the first leaf node;
        map a second subset of the plurality of geohashes to a second leaf node of the plurality of leaf nodes based on the respective geohash value of the second leaf node;
        increment, by a cardinality of the second subset, a second counter value for the second leaf node; and
        prune, in response to a second density threshold exceeding the second counter value for the second leaf node, the second leaf node and every sibling of the second leaf node from the geocode tree.

8. The system of claim 7, wherein the geocode tree is of a type selected from the group consisting of a perfect tree, a complete tree, and a balanced tree.

9. The system of claim 7, wherein the plurality of positions are obtained from a data source comprising population density data.

10. The system of claim 7, wherein the plurality of positions comprise global positions of mobile devices.

11. The system of claim 7, wherein the tree maintenance application further causes the computer processor to:
receive a reverse geocode lookup request comprising a new position;
generate a new geohash using the new position;
map the new geohash to a leaf node of the plurality of leaf nodes based on the geohash value of the leaf node; and
return an identifier of the subdivision of the geographic area corresponding to the geohash value of the leaf node.

12. The system of claim 11, wherein the identifier is of a type selected from the group consisting of a map tile, an address range, a zip code, and a place name.

13. A non-transitory computer readable medium storing instructions for maintaining a density-based geocode tree, the instructions comprising functionality to:
obtain a geocode tree comprising a plurality of leaf nodes each having a geohash value corresponding to a subdivision of the geographic area;
obtain a plurality of positions within the geographic area;
generate, using the plurality of positions, a plurality of geohashes;
map a first subset of the plurality of geohashes to a first leaf node of the plurality of leaf nodes based on the respective geohash value of the first leaf node;
increment, by a cardinality of the first subset, a first counter value for the first leaf node;
graft, in response to the first counter value exceeding a first density threshold, at least one child node onto the first leaf node;
map a second subset of the plurality of geohashes to a second leaf node of the plurality of leaf nodes based on the respective geohash value of the second leaf node;
increment, by a cardinality of the second subset, a second counter value for the second leaf node; and
prune, in response to a second density threshold exceeding the second counter value for the second leaf node, the second leaf node and every sibling of the second leaf node from the geocode tree.

14. The non-transitory computer readable medium of claim 13, wherein the geocode tree is of a type selected from the group consisting of a perfect tree, a complete tree, and a balanced tree.

15. The non-transitory computer readable medium of claim 13, wherein the plurality of positions are obtained from a data source comprising population density data.

16. The non-transitory computer readable medium of claim 13, wherein the plurality of positions comprise global positions of mobile devices.

17. The non-transitory computer readable medium of claim 13, wherein the instructions further comprise functionality to:
receive a reverse geocode lookup request comprising a new position;
generate a new geohash using the new position;
map the new geohash to a leaf node of the plurality of leaf nodes based on the geohash value of the leaf node; and
return an identifier of the subdivision of the geographic area corresponding to the geohash value of the leaf node.

* * * * *